Figure 1:
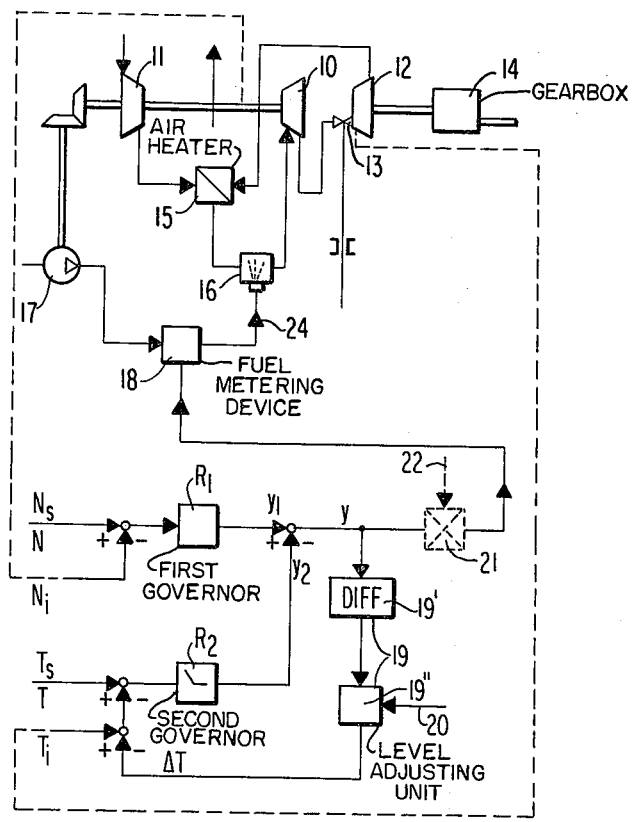

United States Patent [19]
Greune et al.

[11] 3,886,730
[45] June 3, 1975

[54] GOVERNING DEVICE FOR A GAS TURBINE SYSTEM

[75] Inventors: Christian Greune, Furstenfeldbruck; Friedrich Hackl, Neu-Esting; Karl Maier, Munich, all of Germany

[73] Assignee: Motoren-und Turbinen-Union Munich GmbH, Germany

[22] Filed: Dec. 21, 1972

[21] Appl. No.: 317,306

[30] Foreign Application Priority Data
Dec. 21, 1971 Germany.............................. 2163344

[52] U.S. Cl............................................ 60/39.28 R
[51] Int. Cl. ............................................. F02c 9/08
[58] Field of Search .................. 60/39.28 T, 39.28 R

[56] References Cited
UNITED STATES PATENTS

| | | | |
|---|---|---|---|
| 2,948,114 | 8/1960 | Beslier | 60/39.28 T |
| 3,007,307 | 11/1961 | Skellern | 60/39.28 T |
| 3,019,604 | 2/1962 | Hall | 60/39.28 T |
| 3,098,356 | 7/1963 | Joline | 60/39.28 T |
| 3,158,996 | 12/1964 | Herbert | 60/39.28 T |
| 3,691,405 | 9/1972 | Kendell | 60/39.28 T |

*Primary Examiner*—Clarence R. Gordon
*Attorney, Agent, or Firm*—Craig & Antonelli

[57] ABSTRACT

Governing device for a gas turbine system exemplified by a vehicular or aircraft engine having a first governor to vary the fuel flow and a second governor to additively or alternatively reduce the fuel flow apportioned by the first governor, where the sensor provided for detecting variations in the regulating variable of the second governor is subject to lag, characterized in that the variation in fuel flow is automatically convertible into a variation ($\Delta T$) of the regulating variable (T) of the second governor ($R_2$), making it variable in time, and in that the latter variation ($\Delta T$) is automatically imposed on the deficiently sensed instantaneous value ($T_i$) of this regulating variable (T).

11 Claims, 2 Drawing Figures ical value, i.e., its critical value, is not exceeded.

GOVERNING DEVICE FOR A GAS TURBINE SYSTEM

The present invention relates to a governing device for a gas turbine system, such as a vehicular or aircraft engine having a first governor to vary the fuel flow and a second governor to additively or alternatively reduce the fuel flow apportioned by the first governor, where the sensor provided for detecting variations in the regulating variable of the second governor is subject to a delay.

Governing devices for gas turbine engines are known wherein a governor maintains a regulating variable at a consistent level by varying the fuel flow. Frequently, this regulating variable constitutes the rotational speed of a turbine in the engine. Supplementary governing devices employing openloop circuits are also known which prevent certain extreme conditions of the engine from being exceeded. It has thus been a practice to control the maximum allowable fuel flow for a given acceleration cycle by relating it to characteristic engine quantities.

It has been attempted very recently to improve these limiting devices by measuring the critical quantity and regulating it via a second governor. An advantage afforded to instationary operating performance by this closed-loop control circuit lies in that disturbances in fuel metering are stabilized and are thereby prevented from becoming effective. A further advantage is that the measuring and converting of some characteristic engine quantities can frequently be waived and the governing device thus be simplified.

One drawback afflicting two-governor operations in which the first governor remains engaged most of the time while the second governor safeguards a limit, is that most sensors for sensing a limit, e.g., temperature, or most sensors for sensing the regulating variable of the second governor, exhibit an excessive amount of inertia, so that a variation in the regulating variable of the second governor, as caused by a variation in the fuel flow, will be detected by such sensor, but with a delay. Then, when the limit is rapidly being approached, the response of the sensor is too sluggish, so that an overshooting and an exceeding of the limit ensue.

A main object of the present invention is to eliminate the disadvantages or prior art governing systems.

It is a particular object of the present invention to provide a governing device for automatically converting a variation in fuel flow into a variation in the regulating variable of the second governor, making it variable with time, and for automatically imposing the latter variation on the deficiently sensed instantaneous value of this regulating variable. Thus, the manipulated variable of the governors is in operation continually and is automatically transformed into a value added onto the regulating variable of the second governor. This automatic transformation occurs such that the added value exhibits a certain rapid time behavior. The added value is imposed automatically on the said instantaneous value as long as the sensor trails behind the true value of the regulating variable of the second governor. The second governor thus recognizes the limit of its regulating variable much sooner and reduces, by means of its manipulated variable, the value of the manipulated variable of the first governor much sooner. In this manner the fuel flow is limited when it reaches its critical value, so that the limit of the regulating variable The utilization of rapid-response governing devices is desirable in maximally exploiting the acceleration potential of a gas turbine engine. These devices, however, are exceedingly prone to give trouble from hunting and the risk of violating the limit is then ever present. It is in conjunction with fast-response governing devices that the present invention proves to be of particular value.

The device of this invention finds use especially in the automatic limitation of a temperature downstream of the combustion chamber. This chiefly involves the temperature of the motive gas at the inlet or outlet of a turbine in the gas turbine system (turbine inlet or outlet temperature). The regulating variable of the second governor, therefore, is more particularly a temperature downstream of the combustion chamber. Thus, the variation in fuel flow is automatically convertible into a variation in this temperature, making it variable with time, and the latter variation can be automatically imposed on the deficiently sensed instantaneous value of the temperature, adding a time element thereto.

This provides safe protection of, for example, turbine blades from overheating or of a compressor in a gas turbine system from stalling. Utilization of temperature as a regulating variable provides the added benefit that stress values and thermodynamic characteristic quantities of the turbine can be monitored with relatively little effort, whereas this previously required complex control makes it necessary to sense and transform numerous parameters. This advantage is present only so long as the temperature control circuit or the governing device exhibits the features characterizing the present invention.

While the present invention gives preference to the rotational speed of a turbine in the gas turbine system as a regulating variable of the first governor, this regulating variable may equally be some other characteristic quantity of the gas turbine system, such as a pressure ratio or an aggregate value from several characteristic quantities of this system.

It is equally considered advantageous when, in connection with this invention, the regulating variable of the first governor and the regulating variable of the second governor are pressure ratios or temperature ratios of the gas turbine system. The two regulating variables thus differ only in magnitude during operation. Inasmuch as the number of parameters to be sensed is reduced, this makes for less complex governors.

For automatically converting a variation in fuel flow into a variation in the said regulating variable, at least one characteristic quantity of the gas turbine system is used. Such a conversion quantity can be, for example, the rotational speed of a turbine or a gas mass flow of the gas turbine system. Utilization of this characteristic quantity or quantities permits the automatic computation of the true Variation, as in the temperature downstream of the combustion chamber at a certain variation in fuel flow, and awareness of the characteristic performance of the sensor permits the automatic imposition of an added value, made variable with time, on the deficiently sensed instantaneous value of the regulating variable of the second governor, so that as a result, the instantaneous value of this regulating variable is at least approximately correct in magnitude.

For best results the output quantity of the governors should be a quotient B/K, where B is the fuel flow and K a characteristic quantity or combination of quantities of the gas turbine system, such as the gas mass flow.

Figure 2:
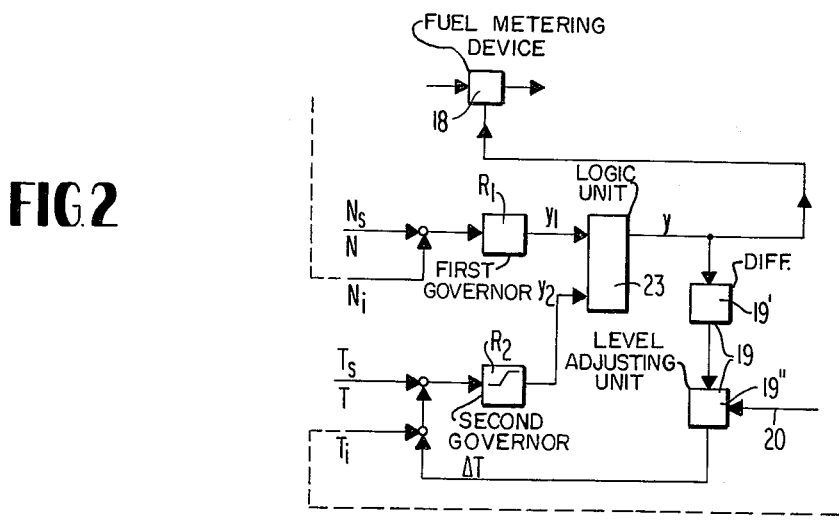

These and other objects, features and advantages of the present invention will become apparent from the following detailed description when taken in conjunction with the accompanying drawings, which illustrate two exemplary embodiments of the present invention, and wherein:

FIG. 1 is a schematic block diagram of one embodiment of the governing device arranged in accordance with the present invention in connection with a vehicular gas turbine engine; and FIG. 2 is a schematic block diagram of a further embodiment of the governing device in accordance with this invention, which governing device can equally be used on the engine of FIG. 1.

The gas turbine engine illustrated in FIG. 1 is a conventional two-spool system having a gas generator turbine 10 to drive a compressor 11 for the combustion air (with excess air) and a power turbine 12 having a variable guide nozzle 13 and providing effective power through a transmission 14. The engine further comprises, as is known, an air heater 15, a combustion chamber 16, a fuel pump 17 and a fuel metering device 18. The function of the engine will become readily apparent from FIG. 1, where arrowheads are used to indicate the flow of air and the flows of gas. Arrowhead 24 indicates the flow of fuel to the combustion chamber 16.

The fuel metering device 18 is under the control of the governing device illustrated in FIG. 1. A first governor $R_1$ of the governing device varies the fuel flow. A second governor $R_2$ of the governing device additively reduces the fuel flow apportioned by the first governor. The regulating variable of the first governor $R_1$ is the speed N of the gas generator turbine 10 and the compressor 11. The specified value of the speed N is indicated by $N_s$, and its instantaneous value by N. The regulating variable of the second governor $R_2$ is the temperature T of the motive gas at the inlet of the power turbine 12. The specified value of this temperature is indicated by $T_s$, and its instantaneous value by $T_i$.

When the fuel flow is increased, a sensor (not shown) will normally measure the temperature T with some delay. The governing device therefore comprises a conversion circuit 19 formed by a correction circuit 19' for automatically differentiating with respect to time the manipulated variable y representing the sum of the outputs of the governors $R_1$ and $R_2$, which automatically forms a timing element, and a control circuit 19" for automatically converting the result of the differentiation, which is subject to the timing element, in response to at least one of the characteristic quantities of the engine into a temperature additive value $\Delta T$ for the deficiently sensed value $T_i$. The input of this characteristic quantity or quantities into the control circuit 19" is indicated by an arrowhead 20.

When the fuel flow or the manipulated variable y is increased, for example, the temperature additive value $\Delta T$ is automatically imposed on the deficiently measured instantaneous value $T_i$. While this adjustment lasts, the instantaneous value $T_i$ rises until it reaches its true magnitude and the temperature additive value $\Delta T$ declines to zero, the sum of the two values remaining invariably approximately equal to the true instantaneous value of the temperature. As a result of the said automatic adjustment, the governor $R_2$ reduces, by means of its manipulated variable $y_2$, the magnitude of the manipulated variable $y_1$ in sufficient time that the fuel flow is limited to its critical value and the limit of temperature T is therefore not exceeded.

Drawn in broken line is a multiplier 21 which is incorporated in the governing device when the output quantity of the governors $R_1$ and $R_2$ is a quotient B/K, where B is the fuel flow and K a characteristic quantity or a combination of characteristic quantities of the engine. This characteristic quantity or quantities are automatically fed into the multiplier 21 via line 22. In this instance it may be practical to feed no more than a single constant into the conversion circuit 19".

The fuel metering device 18 can also be controlled by a governing device in the manner illustrated in FIG. 2. This governing device differs from that of FIG. 1 only in that the governor $R_2$ serves to alternately reduce the fuel flow apportioned by the governor 1. For this purpose, the governing device includes a logic selector circuit 23 to automatically select the smaller of the values of the manipulated variables $y_1$ and $y_2$ or of the governor output quantities.

What we claim is:

1. In a gas turbine system including a combustion chamber receiving combustion air from a turbine driven compressor and a fuel metering device for metering the flow of fuel to said combustion chamber, a governing arrangement for controlling said fuel metering device comprising first governor means responsive to a first engine operating characteristic for generating a first control signal, a sensor having an inherent response delay for sensing a second engine operating characteristic, second governor means connected to said sensor for generating an adjusting signal, logic means responsive to the first control signal and the adjusting signal for providing an output fuel flow control signal for application to said fuel metering device, and control means responsive to variations in said output fuel flow control signal and a signal representing a third engine operating characteristic for automatically controlling said second governor means to compensate for the inherent response delay of said sensor, said control means including a differentiating circuit means for differentiating the output fuel flow control signal, signal level adjusting means responsive to said third engine operating characteristic and the output of said differentiating circuit means for generating a signal representing an additive value for the value insufficiently sensed by said sensor as a result of the response delay, and a first summing junction receiving the output of said sensor and the output of said signal level adjusting means for controlling said second governor or means.

2. The combination defined in claim 1, wherein the outputs of said first and second governor means are connected to a second summing junction forming said logic means providing the output fuel flow control signal.

3. The combination defined in claim 1, wherein said logic means is connected between said respective first and second governor means and said fuel metering device for providing as the output fuel flow control signal the smaller of the outputs of said first and second governor means.

4. The combination defined in claim 1, wherein the engine characteristic to which said first governor means is responsive is the rotational speed of said turbine.

5. The combination defined in claim 1, wherein said signal representing said third engine operating characteristic is proportional gas flow through the engine.

6. The combination defined in claim 1, wherein said signal representing said third engine operating characteristic is the rotational speed of said turbine.

7. The combination defined in claim 1, wherein the outputs of said first and second governor means is a quotient value B/K, where B is fuel flow and K is at least one characteristic value of the gas turbine system.

8. The combination defined in claim 2, further including a multiplier having one input connected to the output of said second summing junction and a second input receiving a signal representing an additional engine operating characteristic, the output of the multiplier being connected to said fuel metering device.

9. The combination defined in claim 1, wherein the engine characteristic to which said second governor means is responsive is a temperature downstream of said combustion chamber.

10. The combination defined in claim 1, wherein the engine characteristics to which said first and second governor means are responsive are pressure ratios of the gas turbine system.

11. The combination defined in claim 1, wherein the engine characteristics to which said first and second governor means are responsive are temperature ratios of the gas turbine system.

* * * * *